United States Patent [19]

Noschese et al.

[11] Patent Number: 5,429,522

[45] Date of Patent: Jul. 4, 1995

[54] PROTECTED COMMUNICATIONS SOCKET

[75] Inventors: Rocco J. Noschese, Wilton; Heinz Piorunneck, Trumbull, both of Conn.

[73] Assignee: Burndy Corporation, Norwalk, Conn.

[21] Appl. No.: 181,767

[22] Filed: Jan. 21, 1994

[51] Int. Cl.⁶ .......................................... H01R 13/44
[52] U.S. Cl. .................................. 439/133; 439/142; 439/638
[58] Field of Search ............... 439/133, 136, 142, 511, 439/540, 314, 320, 638

[56] References Cited

U.S. PATENT DOCUMENTS

| | | | |
|---|---|---|---|
| 3,493,915 | 2/1970 | Cox | 439/511 X |
| 3,811,004 | 5/1974 | Moore | 439/142 X |
| 3,831,128 | 8/1974 | Paluch | 439/142 |
| 4,302,624 | 11/1981 | Newman | 439/133 X |
| 4,311,883 | 1/1982 | Kidney | 179/189 R |
| 4,584,856 | 4/1986 | Petersdoff et al. | 70/57 |
| 4,740,168 | 4/1988 | Carney et al. | 439/133 |
| 4,862,500 | 8/1989 | May | 379/445 |
| 4,893,488 | 1/1990 | Klein | 70/360 |
| 4,911,646 | 3/1990 | Marson et al. | 439/133 |
| 4,970,349 | 11/1990 | Jones | 439/142 X |
| 5,119,419 | 6/1992 | McDaid | 379/445 |
| 5,224,868 | 7/1993 | Tseng | 439/136 |

FOREIGN PATENT DOCUMENTS 585750  10/1933  Germany .......................... 439/133

OTHER PUBLICATIONS

1. Advertisement, "Introducing Floor Jack from Suttle Apparatus", Suttle Appatatus Corporation, 1980, one page.

*Primary Examiner*—Z. R. Bilinsky
*Attorney, Agent, or Firm*—Perman & Green

[57] ABSTRACT

A modular communications connection system is provided for connecting a plug connector to a socket connector. The system includes a blocker that blocks the entrance to the socket connector. A key can be used to move the blocker to allow the plug connector to be inserted into the socket connector.

8 Claims, 4 Drawing Sheets

PROTECTED COMMUNICATIONS SOCKET

BACKGROUND OF THE INVENTION

1. Field of the Invention

The present invention relates to connectors and, more particularly, to connectors used in communications.

2. Prior Art

Modular communication plugs and sockets are well known in the art. One example is a telephone jack known as the RJ11C. In the past, various devices have been used to prevent modular communications sockets from being used. Some of these devices can be found in U.S. Pat. Nos. 4,584,856; 4,862,500; 4,311,883; 4,740,168; 4,893,488; 4,911,646; and 5,119,419. A company called Suttle Apparatus Corporation also offered for sale in 1980 modular telephone jacks that had spring-loaded, self-closing protective doors to minimize entrance of contaminants.

SUMMARY OF THE INVENTION

In accordance with one embodiment of the present invention a modular communications socket is provided comprising a housing, electrical contacts, a door, and means for moving the door between two positions. The housing has a plug receiving area. The electrical contacts are mounted to the housing and extend into the plug receiving area. The door is pivotably mounted to the housing between a first position and a second position. The first position has the door located in front of an entrance to the plug receiving area in a blocking position to prevent a plug connector from being inserted into the plug receiving area. The second position comprises the door being located in a non-blocking position relative to the entrance.

In accordance with another embodiment of the present invention a modular communications connection system is provided for connecting a plug connector to a socket connector. The system comprises a frame, a blocker movably mounted to the frame, and a key. The frame has a key receiving area. The socket connector has a plug receiving area for receiving the plug connector. The blocker is movable between a first blocking position in front of an entrance to the plug receiving area and a second non-blocking position. The key is suitably sized and shaped to be inserted into the key receiving area for moving the blocker from the first blocking position to the second non-blocking position. A user must use the key to move the blocker to the second non-blocking position in order to allow the plug connector to be inserted into the socket connector.

In accordance with another embodiment of the present invention a modular communications connection system for connecting a plug connector to a socket connector is provided. The system comprises a blocker, a plug adaptor connected to the plug connector, and means for moving the blocker. The blocker is movably connected to the socket connector between a first position at an entrance to a plug receiving area of the socket connector and a second position spaced from the entrance. The plug adaptor is connected to the plug connector and is suitably sized and shaped to be inserted into the plug receiving area and allow contacts of the plug connector to contact contacts of the socket connector. The plug adaptor is prevented from being inserted into the plug receiving area unless the blocker is located at the second position.

BRIEF DESCRIPTION OF THE DRAWINGS

The foregoing aspects and other features of the present invention are explained in the following description, taken in connection with the accompanying drawings, wherein.

DETAILED DESCRIPTION OF THE INVENTION

Figure 1:
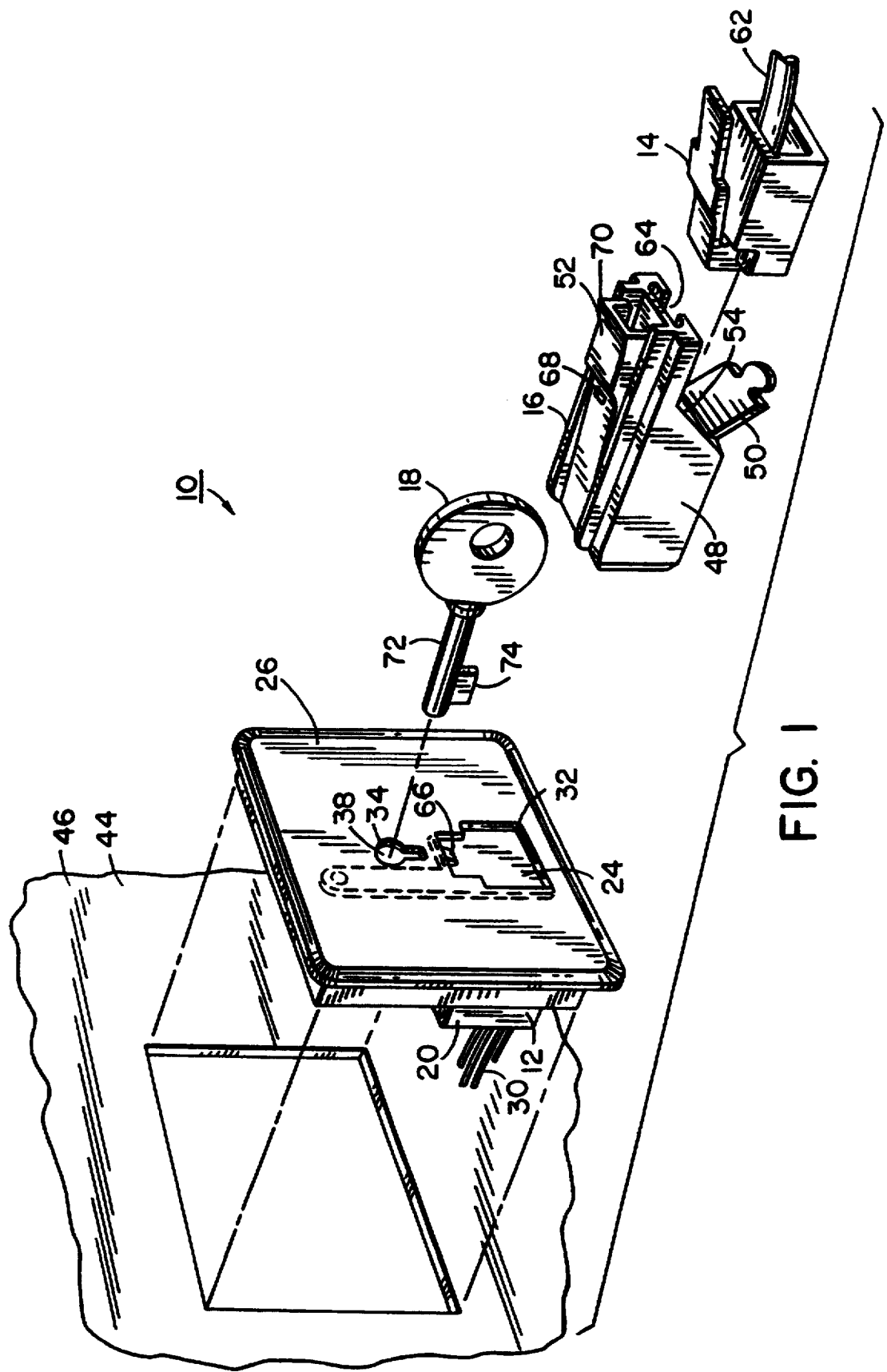
FIG. 1 is an exploded perspective view of a modular communications connection system incorporating features of the present invention.

Referring to FIG. 1, there is shown an exploded view of a modular communications connection system 10 incorporating features of the present invention. Although the present invention will be described with reference to the embodiments shown in the drawings, it should be understood that the present invention can be embodied in various different forms of embodiments. In addition, any suitable size, shape or type of elements or materials could be used.

Referring also to FIGS. 2-5, the system 10 generally comprises a socket connector 12, a plug connector 14, a plug connector adaptor 16 and a key 18. The socket connector 12 has a frame or housing 20, electrical contacts 22, a door or blocker 24, and a face plate 26. The housing 20 is made of dielectric material with a plug receiving area 28. The contacts 22 are spring contacts, are mounted to the housing 20, and project into the receiving area or plug receiving area recess 28. Wires 30 extend from the contacts 22 to a suitable location, such as a central communications system. The housing 20 is connected to a rear of the face plate 26.

The face plate 26 has a first aperture 32 that forms an entrance to the receiving area 28, and a second aperture 34 that combines with area 36 in the housing 20 to form a keyhole 38. The face plate 26 has a pin section 40. The blocker 24 is pivotably mounted on the pin section 40. The blocker 24 is located between the face plate 26 and housing 20. In the embodiment shown, the face plate 26 is used to connect the socket connector 12 to the rear 44 of a chair 46, such as a seat in an aircraft. However, the present invention could be used in any suitable environment.

Figure 2:
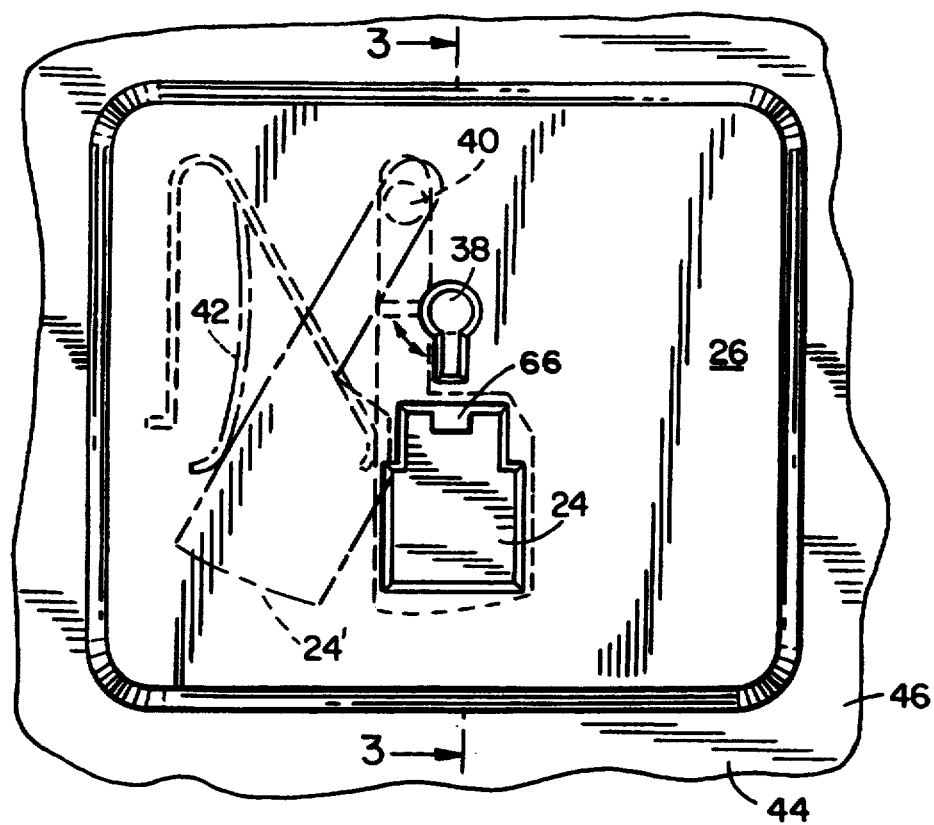
FIG. 2 is an elevation view of the entrance to the socket connector in the system shown in FIG. 1.
Figure 3:
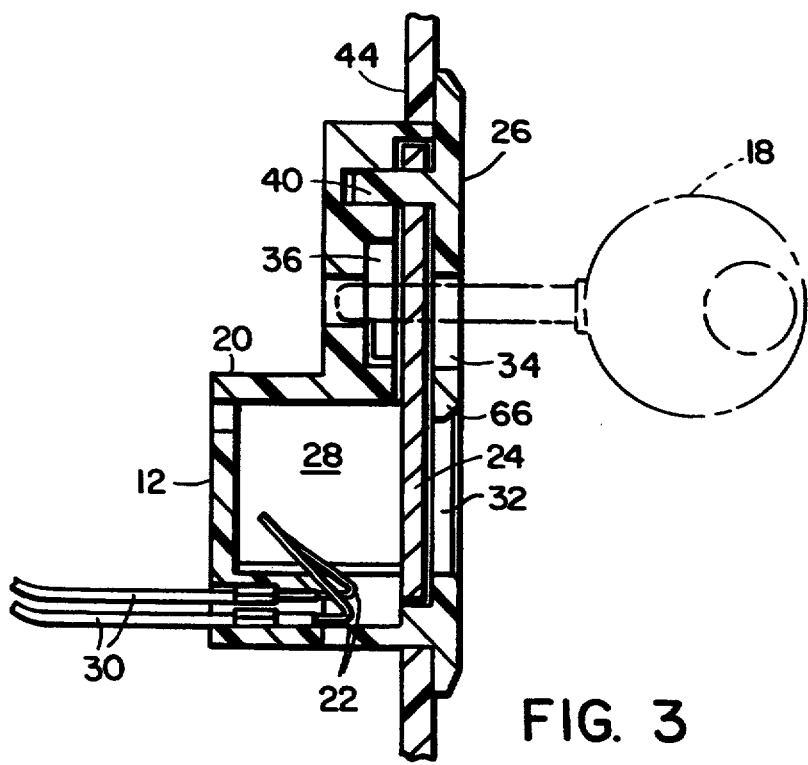
FIG. 3 is a partial cross-sectional view of the socket connector and mounting frame shown in FIG. 2 taken along line 3—3.

A spring 42 is connected to the face plate 26 that biases the blocker 24 at a first blocking position as shown in FIGS. 1 and 2. This first blocking position has the blocker located at the entrance 32 to the plug receiving area 28. The key 18 can be used to move the blocker 24 from the first blocking position to a second non-blocking position 24' as seen in FIG. 2. In this non-blocking position 24', the blocker 24 is moved out of the path of the entrance to the receiving area 28. When the key 18 is removed, the spring 42 is able to bias the blocker 24 back to its first blocking position.

Figure 4:
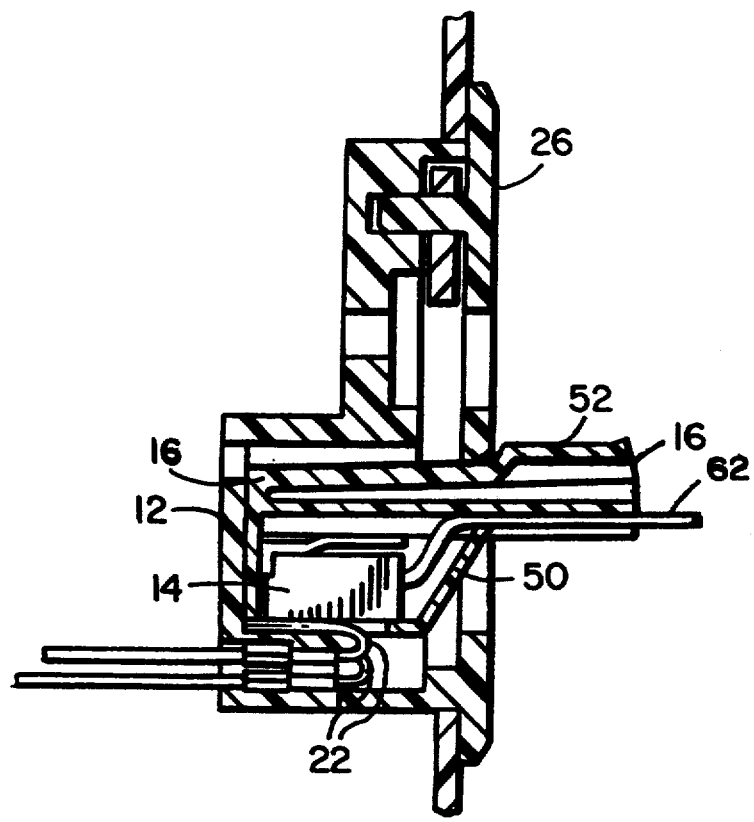
FIG. 4 is a cross-sectional view of the socket connector and frame as in FIG. 3 showing insertion of the plug connector into the socket connector.
Figure 5:
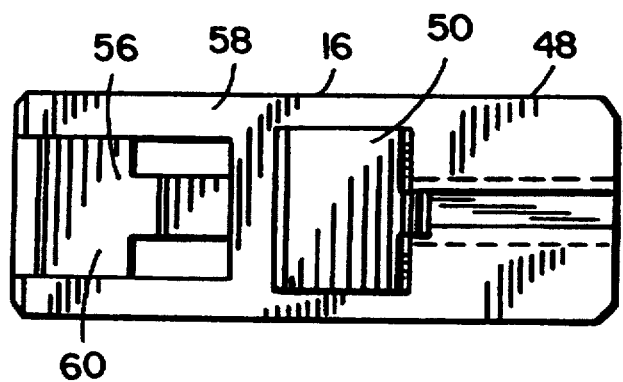
FIG. 5 is a plan bottom view of the plug connector adaptor shown in FIG. 1.

The plug adaptor 16 generally comprises a housing 48, a door 50, and a latch 52. The housing 48 has an entrance 54 at its rear, an aperture 56 at its bottom 58, and an interior holding area 60 for holding the plug connector 14. The plug connector 14 is inserted through the entrance 54 into the holding area 60. The door 50 is then latched closed. The wire 62 from the plug connector 14 extends through the channel 64 out of the adaptor 16. The contacts (not shown) of the plug connector 14 are located at the aperture 56. When the plug connector 14 and adaptor 16 are inserted into the receiving area 28 of the socket connector 12, as shown in FIG. 4, the aperture 56 allows access of the socket contacts 22 to the contacts of the plug connector 14.

The face plate 26 has a latch hook 66. The latch hook 66 cooperates with a hole 68 on the latch 52 of the adaptor 16 to removably snap-lock latch the adaptor 16 to the face plate 26. Because the socket connector 12 is attached to the face plate 26 and the plug connector 14 is contained in the adaptor, the plug connector 14 is removably snap-lock connected to the socket connector 12 when the adaptor 16 is snap-lock connected to the face plate 26. The latch hook 66 has a front ramp shape. The latch 52 is downwardly deflectable. Thus, when the adaptor 16 is inserted into the receiving area 28, the latch hook 66 causes the latch 52 to deflect downward and then snap back when the latch hook 66 comes into registry with the hole 68. In order to unlatch the adaptor 16 from the face plate 26, and thus unplug the plug connector 14 from the socket connector 12, a user merely presses down on finger contact area 70 of the latch 52 to deflect the latch 52. This disengages the latch 52 from the latch hook 66. This allows the adaptor 16 to be removed.

The key 18 merely comprises a shaft 72 and a projection 74. However, any suitable key could be used. When the shaft 72 is rotated in the keyhole 38 in a clockwise direction, the projection 74 contacts the blocker 24 and causes the blocker 24 to pivot at the pin section 40. After the adaptor 16 is inserted into receiving area 28, the key 18 can be removed. Although the blocker 24 is biases by the spring 42, the blocker 24 will be stopped from blocking the entrance to the socket connector 12 by the mere presence of the adaptor 16 in the entrance. When the adaptor 16 is removed from the socket connector 12, the blocker 24 will merely be spring closed back to its first blocking position. In the aircraft environment mentioned above, the key would preferably be carried by a flight attendant such that access to the socket connector 12 could only be obtained when a passenger requested the flight attendant for access. Likewise, the flight attendant could also distribute one of the adaptors when requested by a passenger.

The present invention prevents access to the socket connector 12 without a key in order to prevent damage or contamination of the socket connector. For example, the present invention would prevent a child from sticking articles into the socket connector 12, such as food, bubble gum, etc., that could render the socket connector inoperative for future passengers. The system nonetheless allows a passenger with a device, such as a computer with a modem, access to a communications terminal with only minimal inconvenience of asking a flight attendant to unlock or move the blocker 24 and for one of the adaptors 16. Keys 18 and adaptors 16 could also be distributed or sold to adult passengers, upon request, for them to keep for future travels.

Figure 6:
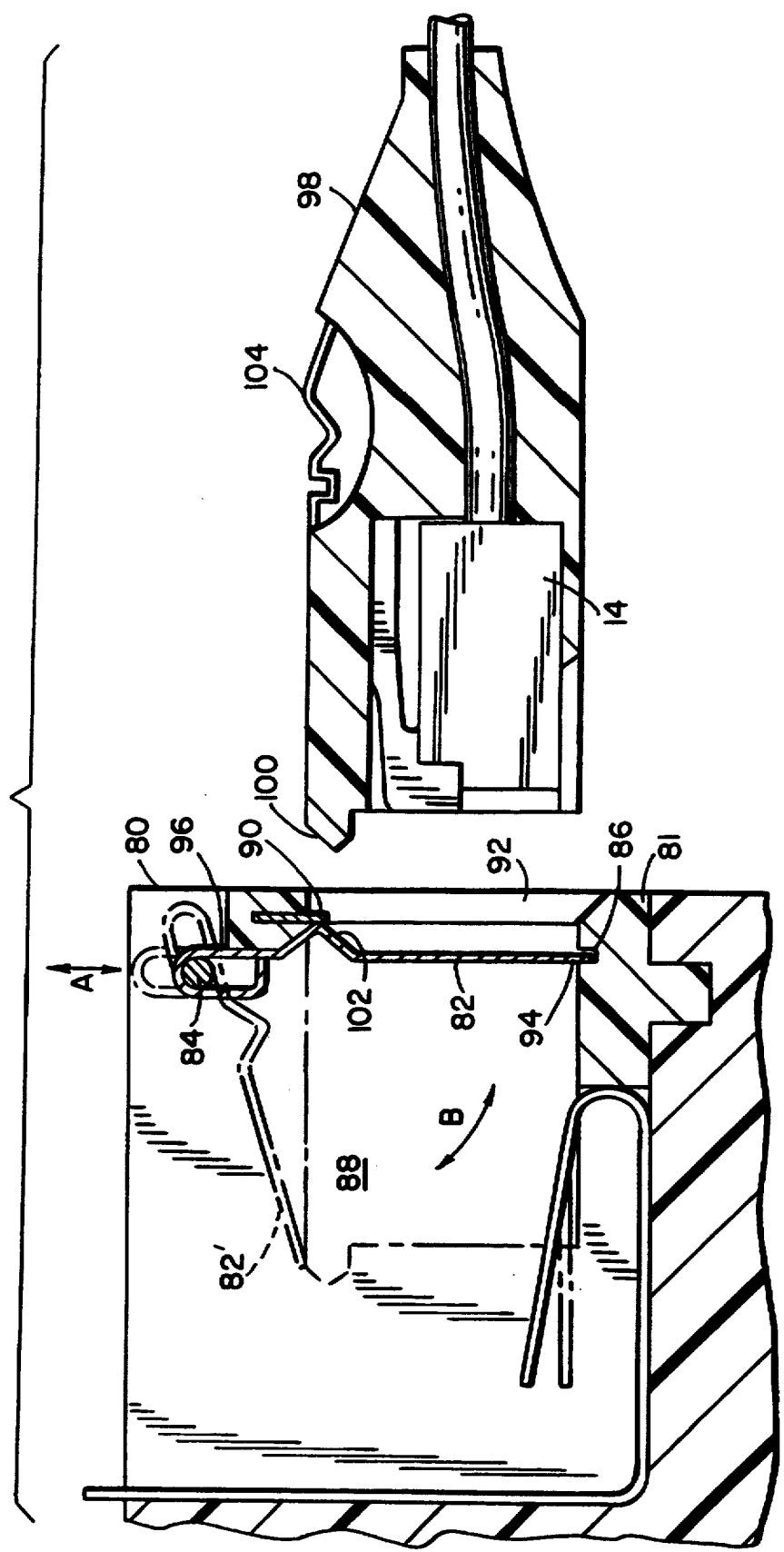
FIG. 6 is a schematic cross-sectional view of an alternate embodiment of the system shown in FIG. 1.

Referring now to FIG. 6, there is shown an alternate embodiment of the present invention. In the embodiment shown, the socket connector 80 has housing 81 and a blocker 82 attached to a pin 84. The pin 84 is fixedly connected to the housing 81. The housing 81 has a recess 86 at the bottom of the entrance 92 to the socket connector receiving area 88. A latch hook 90 is connected to the housing 81 at the top of the entrance 92. A first end 94 of the blocker 82 is located in the recess 86 in the blocking position shown. A second end 96 of the blocker 82 is connected to the pin 84. The second end 96 is suitably shaped to move on the pin 84 in two paths; a first path in an upward direction, as shown by arrow A, and a second path in a pivoting direction, as shown by arrow B. In order to move the blocker 82 in the pivoting direction of the second path B, the blocker 82 must be moved in an upward direction in the first path A. This moves the first end 94 out of the recess 86. The location of the first end 94 in recess 86 prevents the entrance from being opened unless the blocker 82 is first moved up. In order to move the blocker 82 upward, the adaptor 98 has a front ramp 100. The blocker 82 also has a ramp 102. The two ramps 100, 102 contact each other when the adaptor 98 is pressed against the blocker 82. The two ramps 100, 102 cooperate to move the blocker 82 upward. When the first end 94 moves out of the recess 86, the blocker 82 can then pivot open as indicated by arrow B and dashed lines 82'. When the adaptor 98 is removed, a suitable spring (not shown) can return the blocker back to its blocking position with first end 94 in recess 86. The adaptor 98 also has a latch 104 that cooperates with latch hook 90 to stationarily connect the adaptor 98 to the socket connector 80. This second described embodiment does not require a key to move the blocker, but nonetheless helps to prevent unintentional movement of the blocker. In other alternate embodiments, any suitable type of key could be provided including an electronically controlled key or electronically controlled station that could open the entrance to the socket connector from a central location, such as a flight attendant's area on an aircraft. A system that does not require a plug adaptor could also be developed and, other types of blockers or opening of the entrances could be provided.

It should be understood that the foregoing description is only illustrative of the invention. Various alterative and modifications can be devised by those skilled in the art without departing from the spirit of the invention. Accordingly, the present invention is intended to embrace all such alternatives, modifications and variances which fall within the scope of the appended claims.

What is claimed is:

1. A modular communications connection system for connecting a plug connector to a socket connector, the system comprising:
 a frame having a key receiving area;
 a blocker movably mounted to the frame, the socket connector having a plug receiving area recess for receiving the plug connector, the blocker being movable between a first blocking position at an entrance to the plug receiving area recess and a second non-blocking position;
 a key suitably sized and shaped to be inserted into the key receiving area recess for moving the blocker from the first blocking position, wherein a user must use the key to move the blocker to the second non-blocking position in order to allow the plug connector be inserted into the socket connector; and a plug connector adaptor substantially surrounding the plug connector, the adaptor being suitably sized and shaped to be inserted into the plug receiving area recess and allow contacts of the plug connector to contact contacts of the socket connector when the adaptor and plug connector are inserted into the plug receiving area recess.

2. A system as in claim 1 wherein the blocker is pivotably mounted to the frame.

3. A system as in claim 1 further comprising a spring biasing the blocker at the first blocking position.

4. A system as in claim 1 wherein the frame comprises a face plate adapted to be attached to a rear of a seat.

5. A modular communications socket comprising:

a housing having a plug receiving area;

electrical contacts mounted to the housing and extending into the plug receiving area;

a door pivotably mounted to the housing between a first position and a second position, the first position having the door being located at an entrance to the plug receiving area in a blocking position to prevent a plug connector from being inserted into the plug receiving area and, the second position comprising the door being located in a non-blocking position relative to the entrance; and means for moving the door between the first and second positions wherein the means for moving comprises the housing having a recess for holding one end of the door when the door is in the first position, the door needing to be moved out of the recess in a first direction before the door can be pivoted open in the second direction, orthogonal to the first direction, to the second position.

6. A modular communications connection system for connecting a plug connector to a socket connector, the system comprising:

a blocker movably connected to the socket connector between a first position at an entrance to a plug receiving area of the socket connector and a second position spaced from the entrance;

a plug adaptor connected to the plug connector, the plug adaptor being suitably sized and shaped to be inserted into the plug receiving area and allow contacts of the plug connector to contact contacts of the socket connector; and means for moving the blocker wherein the plug adaptor is prevented from being inserted into the plug receiving area unless the blocker is located at the second position wherein the blocker is pivotably mounted to the socket connector by means of a pin and, the blocker is movable on the pin in both a first direction and a second direction orthogonal to the first direction.

7. A system as in claim 6 wherein the means for moving comprises the plug adaptor having a ramp to move the blocker in the first direction as the plug adaptor is inserted into the plug receiving area.

8. A system as in claim 7 wherein the socket connector has a recess for holding an end of the blocker at the first position until the blocker is moved by the ramp in the first direction.

* * * * *